Oct. 25, 1927.
H. Y. NORWOOD
1,646,976
TIME CONTROLLED REGULATING APPARATUS
Filed March 20, 1922    3 Sheets-Sheet 1
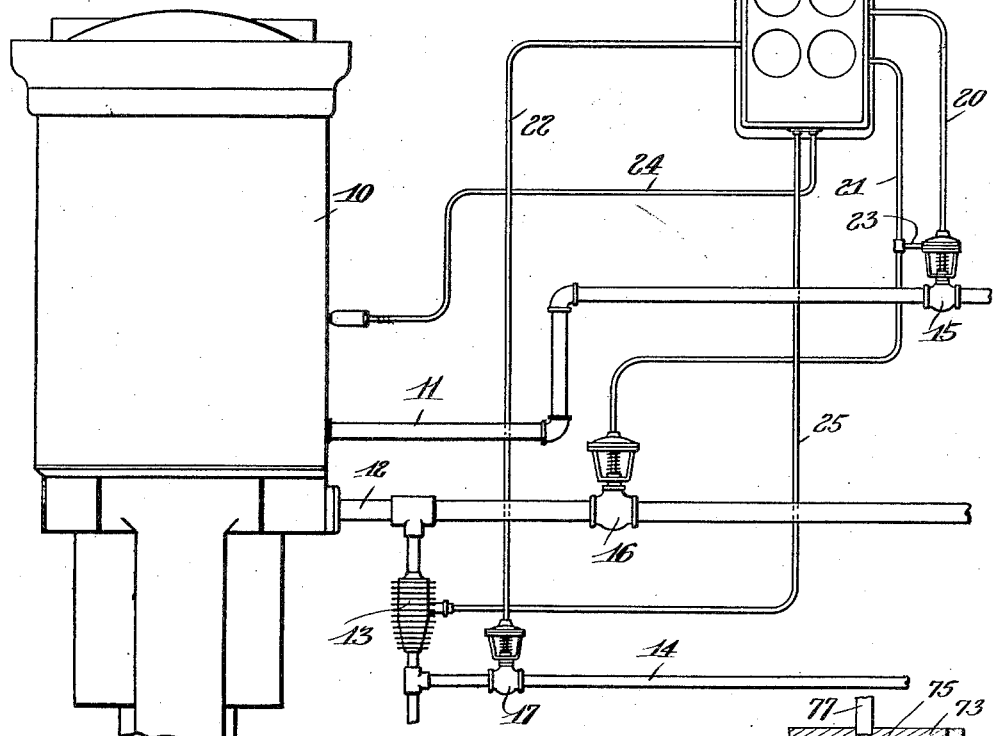
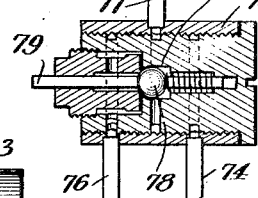
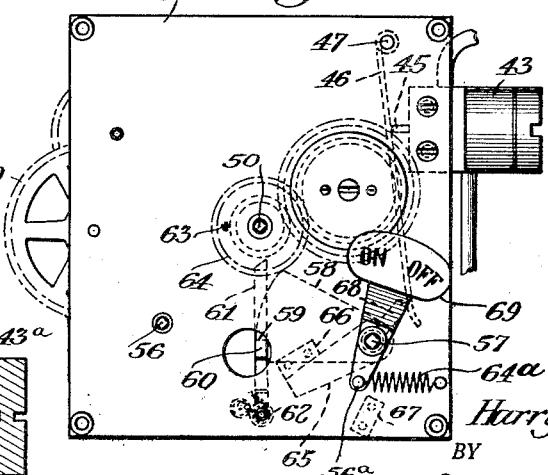
INVENTOR.
Harry Y. Norwood
BY
his ATTORNEY Oct. 25, 1927.  
H. Y. NORWOOD  
1,646,976  
TIME CONTROLLED REGULATING APPARATUS  
Filed March 20, 1922  3 Sheets-Sheet 2

INVENTOR.  
Harry Y. Norwood  
BY  
his ATTORNEY

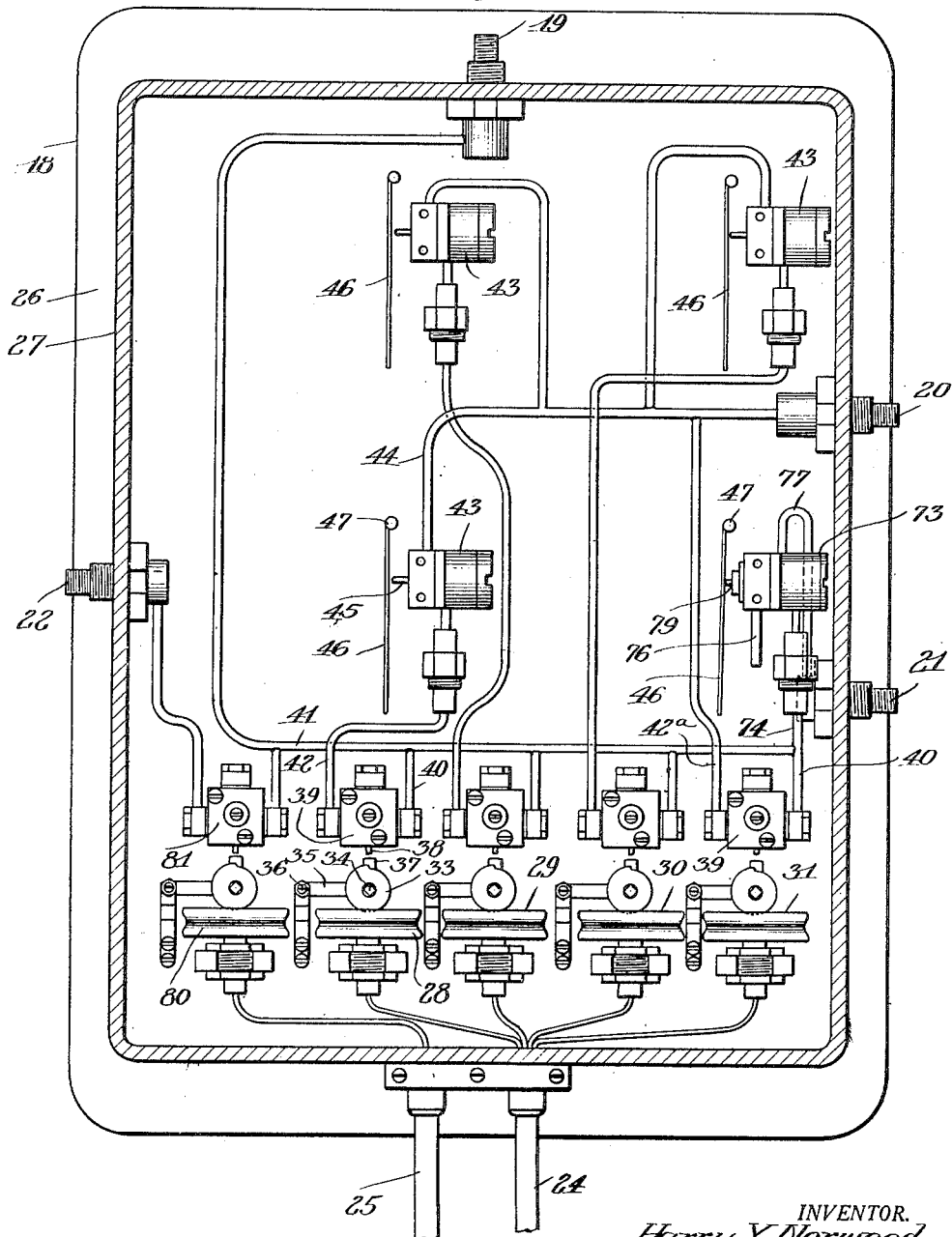

Patented Oct. 25, 1927.

1,646,976

UNITED STATES PATENT OFFICE.

HARRY Y. NORWOOD, OF ROCHESTER, NEW YORK, ASSIGNOR TO TAYLOR INSTRUMENT COMPANIES, OF ROCHESTER, NEW YORK, A CORPORATION OF NEW YORK.

TIME-CONTROLLED REGULATING APPARATUS.

Application filed March 20, 1922. Serial No. 545,119.

This invention relates to time controlled regulating apparatus and more particularly to the variety adapted for regulating conditions such as the temperature or pressure at a given place or within a container, one object of the invention being to provide a practical and efficient apparatus of this character for automatically producing predetermined changes in temperature or pressure conditions over a given period of time. More specifically the invention has for its purpose also to provide a comparatively simple and effective apparatus for automatically and variably regulating the temperature or pressure in a container, in accordance, for example, with a desired curve or schedule, by changes produced at predetermined times in a given period, and comprising means for automatically terminating the operation or process after a given length of time if so desired. To these and other ends the invention resides in certain improvements and combinations of parts all as will hereinafter be more fully described, the novel features being pointed out in the claims at the end of the specification.

In the drawings:

Figure 1 is a view of a regulating apparatus embodying the present invention in one of its applications;

Figure 3 is a view similar to Figure 2 with portions removed to show the operating parts;

Figures 4 and 5 are central sectional views, enlarged, showing the constructions of auxiliary controlling valves employed in the apparatus;

Figure 6 is an enlarged view of one of the time mechanisms showing the cooperation of the same with an auxiliary valve.

Similar reference numerals throughout the several views indicate the same parts.

Figure 2:
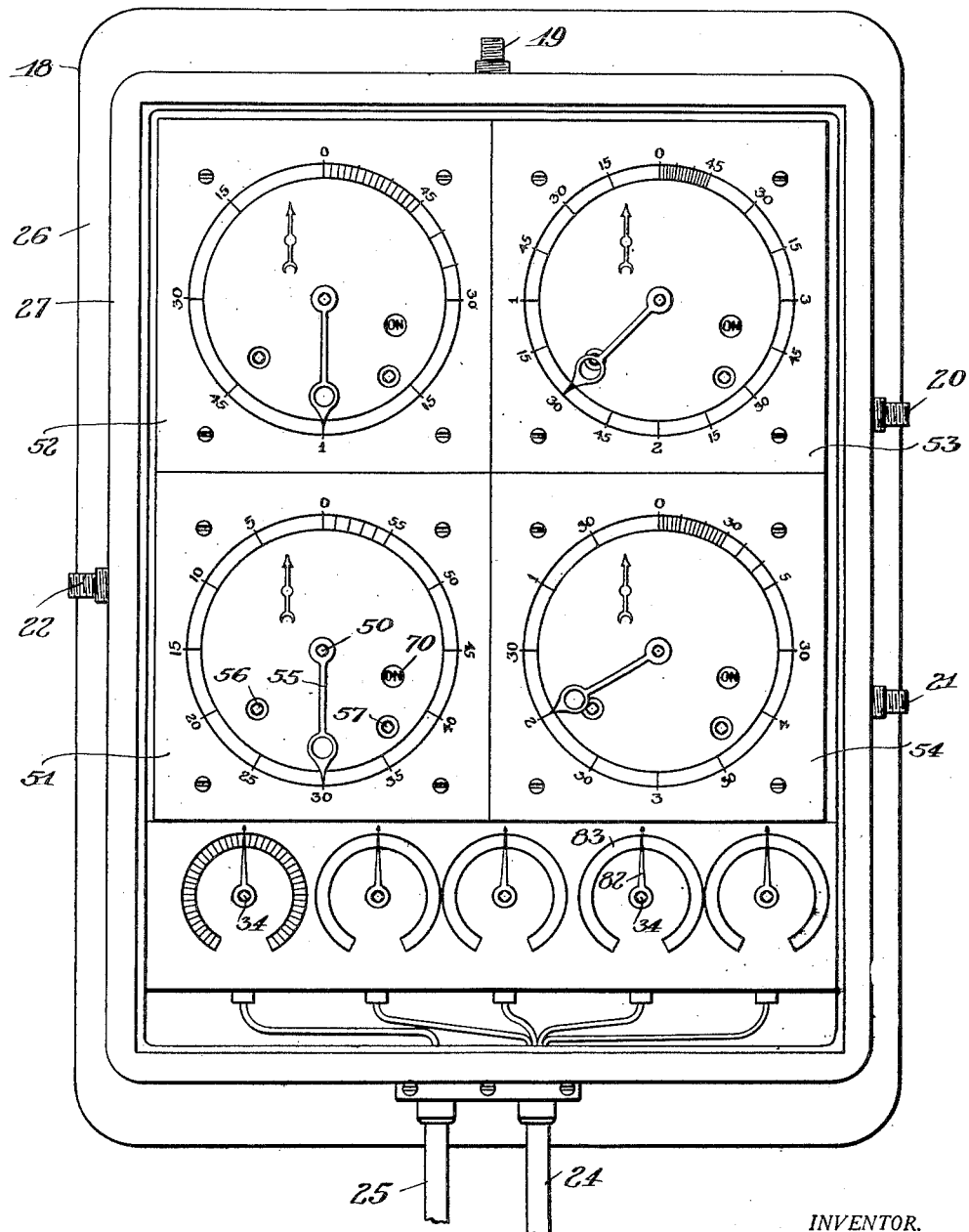
Figure 2 is an enlarged front elevation of the time controlled regulating device proper.

The embodiment of the invention selected for the purposes of the present disclosure, as best illustrating the principles involved and a preferred practical application of the same, shows an adaptation of the invention to the regulation of conditions within a container such as a vulcanizer indicated at 10. Figure 1. As will more fully appear hereafter the invention is applicable to the regulation of either temperature or pressure conditions but as the temperature is the condition desired to be controlled in the present instance the apparatus will be described by way of example with reference more particularly to this form of application. At 11 is shown a conduit or pipe for supplying a heating or cooling fluid to the vulcanizer and at 12 is a conduit for discharging the contents of or exhausting the same. The discharge conduit 12 has connected therewith a condensation trap 13 the discharge from which is carried off through a conduit 14, as well understood in the art. Conduits or pipes 11, 12 and 14 are preferably governed or controlled by automatic valves 15, 16 and 17, respectively, of the diaphragm and spring actuated type, the main valve 15 controlling the flow of the heating or cooling fluid being preferably of the double diaphragm variety for operation by either of two independent means.

The time-controlled regulating device or operating means proper for these connections is shown in a suitable casing at 18, having connected therewith, as will more fully appear hereafter, an auxiliary fluid pressure supply line or pipe 19 and similar lines 20, 21 and 22 for transmitting pressure under the control of the regulator to operate the automatic diaphragm valves 15, 16 and 17, respectively. At 23 is a connection from the line 21 to the double diaphragm valve 15 also. While fluid pressure, and, more particularly, compressed air, is preferred as the operating connection between the regulator and principal valves to be controlled, in the present case, other and equivalent operating connections or relays may of course be substituted for those shown herein. The regulating device 18 is provided also with connections subjected and responsive to the conditions to be controlled, comprising connections 24 and 25 shown as carried from the vulcanizer 10 and condensation trap 13, respectively, into the regulator casing. As temperature is the condition under control in the present application, these connections have the form of what are known as capillary tube systems, with bulbs exposed to the condition to be controlled and pressure responsive diaphragms in the regulator, the systems being filled with a temperature sensitive fluid which expands with an increase in temperature and vice versa to move the diaphragm, as well understood in the art. Where the apparatus is applied to the regulation of pressure as distinguished from temperature these systems may obviously be replaced by simple piping establishing pressure communication between the containers and the pressure responsive diaphragms.

The time controlled regulating device proper is preferably arranged as stated in a casing indicated generally at 18, comprising a base plate 26, Figures 2 and 3, carrying a rectangular wall 27 having suitable closure means at its forward side, within which the operating parts are supported and housed. These parts comprise a plurality of pressure responsive diaphragms 28 to 31 inclusive. Figure 3, preferably of the capsular or wafer variety each connected with and forming part of the temperature sensitive capillary system 24 previously described as terminating in a bulb in the container or vulcanizer. These diaphragms may be connected with a corresponding number of bulbs in the container or with a single common bulb as shown herein. The number of these diaphragms corresponds in the present instance to the number of different temperatures at which it is desired to regulate the container, and each diaphragm has associated therewith means for controlling the main valve 15 governing the flow of the heating or cooling medium. As the several diaphragms and associated parts have in common substantially the same construction, a brief description of one of these units will suffice for all. Resting in contact with the expansive wall of each diaphragm, is an adjusting cam or templet 33 fixed on a spindle 34 rotatably carried at one end of an arm 35 pivotally supported at the other end 36 on a bracket on the casing. Each arm 35 carries also an abutment 37 which is thus arranged to rise and fall with the pressure responsive movement of the diaphragm, it being noted that the end of each spindle 34 is shouldered for engagement by a key or other means for rotating the same to rotate cam 33 and thus adjust the position of abutment 37. The latter is positioned for engagement, upon expansive movement of the diaphragm, with the lower end of an actuating spindle 38 of a valve 39 of any suitable construction, such as that of the valve 43 shown in Figure 4 of the present drawings. Valve 39 controls communication between a pipe 40 connected with a manifold 41 of the fluid pressure supply line 19 and a pipe 42 which as will presently appear, leads to the main operating valve 15. The valve is normally spring actuated to closed position and is opened by inward movement of its spindle by said abutment 37. It is apparent from this construction that each of these regulating devices or units operates upon a rise in temperature in the container to be controlled to cause an expansive movement of the pressure responsive diaphragm which raises abutment 37 into contact with valve stem 38 to lift the valve from its seat and establish communication between pipes 40 and 42, so that the auxiliary actuating fluid pressure is transmitted to the latter to close the main valve and reduce the flow of the heating medium, as will more fully appear hereafter.

As shown on a somewhat exaggerated scale in Figure 3, the abutments 37 and the valve stems 38 which they respectively control are spaced from each other at progressively increasing distances from left to right in the drawing, either in the initial location of the parts in the casing or by adjustment of the cams 33. It is apparent from this arrangement that as the temperature rises in the container and the diaphragms expand the valves 39 will be opened progressively from left to right. The left hand valve will thus be opened first to transmit actuating pressure through means hereafter described to the main valve to close the same at a temperature corresponding to the adjustment of the temperature sensitive means for regulating the temperature at a corresponding degree. When the temperature has been retained at such a point for the desired length of time, the timing mechanism provided terminates the controlling action of this first or left hand temperature responsive device and the temperature continues to rise until the next similar device comes into regulating action. This second device and its successor or successors are correspondingly removed from control one after another by suitable timing mechanism after a given period of time for each until the final or right hand temperature sensitive device 31 comes into action. This final device preferably has its action terminated, not by an individual timing mechanism therefor, as in the case of the preceding units, but by a timing mechanism which controls the operation of the whole apparatus for terminating the operation or process. In the present case, therefore, the apparatus operates to produce successive increases in temperature with regulation for a predetermined period at each of such increased temperatures, although, by obvious modification, decreases as well as increases of temperature could be brought about and controlled. The operation or process is then automatically terminated by the timing mechanism at the end of a predetermined time period, as will hereinafter more fully appear.

Each of the temperature responsive devices described above, therefore, with the exception of the last or right hand one 31, is provided with a timing mechanism which is the same for each so that a description of one will suffice. Pipe 42 leading from valve 39 communicates with the casing of a valve 43, Figure 3, the construction of which is shown in detail in Figure 4 as comprising a chamber in which a ball valve body 43ᵃ co-operates with a seat 43ᵇ to control a passageway connecting the pipe 42 with an outlet pipe 44 connected with the line 20 leading to the main valve 15. The valve body 43ᵃ is provided with a spring as shown for normally retaining the same seated, to cut off communication between the pipes 42 and 44, the valve having also a stem 45 extending exteriorly of the casing for engagement by an arm 46 pivotally supported on a spindle 47 of a time train supported and housed within a frame indicated generally at 48, Figure 6. When arm 46 is held against the valve stem 45 the valve 43 is maintained open to maintain communication between valve 39 and the main valve 15, and allow the the latter to be controlled by valve 39. When arm 46 however is moved out of contact with valve stem 45, valve 43 is closed, so that the control of the corresponding valve 39 over the main valve 15 is terminated. The diaphragm chamber of the main valve 15, or the outlet sides of valves 39 and 43 connected with the same are vented or provided with a slow leak in any suitable manner, as well understood in the art, to exhaust the air pressure on the main valve to permit it to be opened by its spring whenever the auxiliary valves are operated to cut off air pressure from the main valve.

The timing mechanism for controlling the movement of arm 46 and the position of valve 43 is substantially the same for each of the latter valves and also for the valve 73 hereafter described which terminates the operation of the apparatus as a whole, there being in the present instance four such timing mechanisms arranged as shown in Figure 2 within the apparatus casing. Each mechanism comprises the said frame 48 and a time train of gearing indicated generally at 49 within the same and driving a spindle 50. The latter extends through a face plate 51 marked with a suitable dial, Figure 2, and carries an indicating hand 55 movable over the dial. The first or left hand time controlled regulating unit shown in Figure 3 corresponds with the dial 51 of Figure 2 which is marked to correspond with a time period of one hour. The others of these regulating devices from left to right and the final device for terminating the operation correspond to the timing mechanisms and respective dials indicated at 52, 53 and 54, respectively, Figure 2 from which it will be seen that these timing mechanisms and dials have respective time periods of two, four and six hours. Each time mechanism has a winding stem 56 and also a spindle 57, Figure 6, on which is fixed a plate-like arm 58 having an arc shaped portion recessed to provide a shoulder 59. This shoulder is positioned for engagement with a spur 60 on an arm 61 pivotally supported at 62 and provided with suitable spring means normally urging spur 60 toward arm 58. The end of arm 61 lies in the path of a pin 63 carried by a wheel 64 rotating with the time spindle 50. Spindle 57 has fixed thereon also an arm 56ᵃ to which is attached a spring 64ᵃ tending to rotate the spindle in a counter clock-wise direction. The spindle carries also an arm 65 movable between limiting stops 66 and 67 and also an arm 68 adapted to hold arm 46 against valve spindle 45 when arm 58 is in its upper position, or in other words with its shoulder 59 engaged and supported by arm 61. The parts are adapted to remain in this position, when so set by turning spindle 57 in a clock-wise direction, as by means of a key inserted through an opening in the dial plate. When the timing mechanism, however, brings pin 63 into engagement with arm 61 the latter is tripped, releasing arm 58 for rotation by spring 64ᵃ so that arm 46 is released and valve stem 45 is moved outwardly by its spring, Fig. 4, to seat and close valve 43. Spindle 57 has fixed thereon also an indicator 69 visible through an opening 70 in the dial plate, Figure 2, to indicate the position of this mechanism. Spindle 50 and its wheel 64 preferably have a yielding connection with the time train, so that the spindle wheel and indicating hand 55 may be set or rotated counter-clockwise from the zero of the dial a distance corresponding to the time period through which the corresponding regulating device is desired to operate. The timing mechanism, after such setting, rotates wheel 64 and its pin 63 in the opposite direction and into operating engagement with arm 61 at the end of the desired period. The timing mechanisms, of course, may be designed for various periods to suit the work in hand.

The final or right hand valve 39, Figure 3, has no individual timing mechanism but is connected by means of its outlet pipe 42ᵃ directly with the line 20 and the main valve. The operation of this regulating device is terminated at the time of termination of the operation of the entire apparatus by means of a valve 73 controlling a branch 74 of the auxiliary fluid pressure line 41. The construction of this valve is shown in detail in Figure 5 as comprising a chamber 75 communicating through suitable passageways in the casing with the supply line 74, with an atmospheric exhaust 76 and with a line 77 which connects with the line 21 extending to the valves 15 and 16. It is to be noted that supply pipe 74 and exhaust pipe 76 communicate with the valve chamber 75 at the ends of the latter which are provided with seats cooperating with a valve body 78 movable from one seat to the other in the chamber. The outlet pipe 77, however, communicates with the chamber itself, so that when the valve is in one position the outlet pipe 77 communicates with the supply line 74 (as shown in Fig. 5), while in the other position pipe 77 is connected with the exhaust 76. Valve 78 is provided as shown with spring means for moving the same to position for connecting the supply and outlet pipes 74 and 77, and has a spindle 79 extending exteriorly of the casing for engagement with one of the arms 46 previously described as controlled by a timing mechanism. This valve is held by its timing mechanism in position to connect line 77 with the atmospheric exhaust 76, but when the timing mechanism operates as described and releases the valve spindle 79, the fluid pressure supply line 74 is then connected with the line 77 which transmits actuating pressure to the line 21. The latter is connected as shown with the main valve 15 controlling the flow of the heating or cooling medium and also with valve 16 controlling the exhaust from the container. Main valve 15 is of the so-called "reverse acting" type or in other words is closed by the application of pressure to its diaphragm to counter-act the spring which tends to maintain the valve open. Also this valve is provided with two independent actuating diaphragms, as well understood in the art, with which the pipes 20 and 21, respectively, are connected. Thus when pressure is admitted to line 20 by one of the regulating devices 28 to 31 inclusive, or when pressure is admitted to line 21 through the valve 73, valve 15 is by this means partially or entirely closed. Valve 16 on the other hand is preferably of the direct acting type, so that when pressure is admitted by valve 73 to line 21, valve 16 is opened at the same time that valve 15 is closed, which latter operation, of course, abruptly terminates the process by cutting off the supply of regulating medium and exhausting the contents of the container.

The capillary system 25 subjected to conditions within the condensation trap 13 comprises a pressure responsive diaphragm 80 and valve 81 controlled thereby and of the same construction as those already described. Valve 81 is connected with the fluid pressure supply line 41 and with the line 22 leading to the condensation discharge valve 17. As the temperature, for example, in the condensation trap falls, due to the collection of condensed moisture therein, valve 81 is allowed to close, shutting off the fluid pressure from valve 17 which is opened by its spring. On the contrary as the temperature in the trap rises valve 81 is open and admits fluid pressure to close valve 17. The spindles 34 for rotating the cams for adjusting the regulating devices 28–31 inclusive, are preferably extended through the front or dial plate of the apparatus, as shown in Figure 2, and provided with pointers 82 moving over dials 83 for convenience in setting the regulating devices to operate at the desired degrees of temperature or pressure.

The operation of the apparatus has been described in connection with the above explanation of its construction so only a brief summary thereof is required. Assuming for convenience that it is desired to control the temperature in the container by means of heating medium, the timing mechanisms are set by means of their stems 50, and as indicated by pointers 55, for controlling the time of operation of the respective regulating devices. Spindles 34 may also be adjusted as indicated by their pointers 82 and dials 83 to determine the degree of temperature at which the corresponding regulating devices are desired to operate. Spindles 57 are then all turned to the "on" position and with a proper supply of heating medium to the valve 15 and of actuating fluid to line 19, the heating medium, as, for example, steam, heats the container. The temperature in the latter rises, until the first regulating device 28 comes into operation. The latter admits or shuts off the supply of steam, as may be required to maintain the temperature of the container at the degree for which this regulating device is set. Thus as the temperature rises above the predetermined degree for the corresponding period of the process, diaphragm 28 expands, raises abutment 37 against valve stem 38, unseating the valve, as will be apparent from reference to the corresponding valve construction shown in Fig. 4, and permits pressure to flow from pipe 40 to pipe 42 and through valve 43 which is now open, to the main valve 15 to close the latter and reduce the steam supply. Vice versa, at a fall in temperature below the desired degree, valve 39 is closed by its spring, thus cutting off air pressure from valve 15 which is automatically opened by its spring to transmit more steam. In this way the predetermined temperature is maintained. After the predetermined period, timing mechanism 51 operates to permit the closing of valve 43 which terminates the regulating influence of the first device 28. That is to say, air pressure on the valve 15 is removed and it opens under action of its spring to permit a flow of steam to carry the temperature up to the range of the next regulating device. It will thus be apparent that each valve 43 is first held open by the time mechanism to permit the main valve 15 to be controlled by the corresponding regulating valve 39 and that when the time mechanism permits each valve 43 to close, this acts to eliminate the operation of the corresponding valve 39 during the remainder of the process. The temperature then rises rapidly, valve 15 being fully opened until the second regulating device 29 comes into operation automatically to maintain the temperature at the degree for which it is set. This successive regulation at different temperatures is then repeated by the different regulating devices in succession, there being as many of such devices as of different temperatures at which it is desired to regulate the container. Also the difference in degree between the different successive temperatures may be varied as desired by correspondingly adjusting the regulating devices. When the final regulating device 31 has operated for the desired length of time, valve 73 is permitted by its timing mechanism 54 to admit pressure to line 21 and thereby simultaneously close valve 15 and open valve 16 to terminate the process. The condensation valve 17 is operated intermittently by the means described as conditions may require.

The apparatus is simple, practical and effective in construction and operation, obviating the necessity for providing cams or templets for the timing mechanisms. It is conveniently adaptable for producing regulation through a wide range of conditions and time periods, and is fully automatic in action so that it requires no attention after being set in operation, but proceeds automatically to accomplish reliably and accurately the character of regulation desired.

I claim as my invention.

1. In an apparatus and means connected therewith for maintaining prescribed conditions therein including means for supplying a regulating medium, the combination of a plurality of means responsive to the conditions to be regulated, for differently controlling the said supply means and separate time-controlled mechanism for each of said controlling means for making it ineffective at the end of a predetermined period independently of the other controlling means.

2. In an apparatus and means connected therewith for maintaining prescribed conditions therein including means for supplying a regulating medium, the combination of a plurality of means responsive to the conditions to be regulated, for differently controlling the said supply means and separate time-controlled mechanism for each of said controlling means for making it ineffective at the end of a predetermined period, said time-controlled mechanisms being adjustable independently of each other to change at will the duration of the said periods relatively to each other.

3. In an apparatus for maintaining prescribed conditions, the combination with means for supplying a fluid regulating medium, including a connection for admitting fluid to the apparatus, a connection for withdrawing fluid from the apparatus and separate means for controlling the connections, of a plurality of means responsive to conditions within the apparatus for separately governing said controlling means, means for separately adjusting the governing means to vary their governing action and time controlled mechanism for making the separate governing means effective during predetermined periods.

4. In an apparatus for maintaining prescribed conditions, the combination with an intake conduit for passing a fluid regulating medium to the apparatus, an outlet conduit for withdrawing fluid from the apparatus, separate means for controlling the conduits, of a plurality of means responsive to conditions within the apparatus for separately governing the controlling means for the inlet conduit, time controlled means for making the separate governing means effective during prescribed periods and separate means for simultaneously affecting the controlling means of both conduits.

5. In an apparatus for maintaining prescribed conditions, the combination with an inlet conduit for passing a fluid regulating medium to the apparatus, an outlet conduit for withdrawing fluid from the apparatus, a valve for controlling the inlet conduit, a valve for controlling the outlet conduit, a plurality of means responsive to conditions within the apparatus for separately governing the valve in the inlet conduit, time-controlled means for making the separate governing means effective during prescribed periods and time-controlled means for simultaneously governing the valves in both conduits.

6. In a time controlled regulating apparatus, a conduit for supplying a regulating medium, an automatic valve controlling said supply conduit, a plurality of fluid pressure devices each adapted to actuate said valve automatically and comprising sensitive means subjected to the condition to be regulated, said sensitive means being, relatively to one another, differently responsive to said condition to regulate the latter differently, and timing mechanism for effecting operation of different ones of said devices at different times.

7. A time controlled regulating apparatus comprising means for supplying a regulating medium, a plurality of fluid pressure lines each arranged to govern said supply means, a plurality of valves each controlling one of said lines, sensitive means subjected to the condition to be regulated and arranged to operate different ones of said valves corresponding to variations in said regulated condition, and timing mechanism for controlling operation of said fluid pressure lines individually according to time.

8. In a time controlled temperature regulating apparatus, a container the condition within which is to be regulated, means for supplying a heating or cooling medium to said container, a main valve controlling said supply means, a plurality of fluid pressure lines each adapted to actuate said main valve automatically, a plurality of secondary valves each controlling one of said lines, sensitive means subjected to the container temperature and arranged to operate different ones of said secondary valves corresponding respectively to different container temperatures, and timing mechanism for controlling operation of said fluid pressure lines individually according to time.

9. In a time controlled regulating apparatus, a container the condition within which is to be regulated, means for supplying a regulating medium thereto, a main automatic valve controlling said supply means, a plurality of fluid pressure conduits each connected with said main valve for operating the same automatically, a plurality of secondary valves each controlling one of said conduits, sensitive means responsive to conditions in said container and arranged to operate different ones of said secondary valves corresponding to different container conditions to maintain the latter constant, and timing mechanism controlling operation of said conduits individually according to time.

10. In a time controlled regulating apparatus, a container the condition within which is to be regulated, means for supplying a regulating medium thereto, a main automatic valve controlling said supply means, a plurality of fluid pressure conduits each connected with said main valve for operating the same automatically, a pair of secondary valves controlling each of said conduits, sensitive means responsive to conditions in said container and arranged to operate one of each of said different pairs of secondary valves in accordance with different conditions in said container, and timing mechanism controlling the other of each of said pairs of secondary valves according to time.

11. A time controlled regulating apparatus comprising means for supplying a regulating medium, a plurality of regulating devices governing said supply means and all subjected and responsive to the same condition to be regulated, a device for terminating the operation of said supply means, and timing mechanism controlling the operation of said regulating devices in predetermined relative order and the subsequent operation of said terminating device.

12. A time controlled apparatus for regulating conditions in a container comprising means governing the flow of a medium to or from said container, a plurality of regulating devices connected with the container and with said governing means for actuating the latter in accordance with conditions in said container, a device for terminating the flow of said medium and exhausting the same from said container, and timing mechanism controlling operation of said regulating devices in a predetermined order and the subsequent operation of said terminating device.

13. In a time controlled regulating apparatus, the combination of a container the condition within which is to be regulated, a conduit for supplying a regulating medium thereto, means governing the flow of said medium in said conduit, a plurality of regulating devices having actuating connections with said governing means and subjected to the container condition to be regulated, said devices being individually arranged relatively to one another for operation at different predetermined container conditions, a device for actuating said governing means to finally terminate the flow of said medium, and timing mechanism for effecting operation of different ones of said regulating devices at different times and the subsequent operation of said terminating device.

HARRY Y. NORWOOD.